United States Patent [19]

Matumoto

[11] Patent Number: 4,576,058
[45] Date of Patent: Mar. 18, 1986

[54] WORM ASSEMBLY

[75] Inventor: Masakazu Matumoto, Osaka, Japan

[73] Assignee: Kabushiki Kaisha Nikken Kousakusho, Osaka, Japan

[21] Appl. No.: 610,048

[22] Filed: May 14, 1984

[51] Int. Cl.⁴ .......................... F16H 1/16; F16H 1/20; F16H 1/18; F16H 55/17

[52] U.S. Cl. ......................... 74/425; 74/458; 74/424.7

[58] Field of Search ............. 74/425, 424.7, 457, 74/458; 403/26, 260, 343

[56] References Cited

U.S. PATENT DOCUMENTS

| 771,188 | 9/1904 | Thomson | 74/425 |
|---|---|---|---|
| 1,327,567 | 1/1920 | Miles | 74/425 |
| 2,536,920 | 1/1951 | Ducanis | 74/425 |
| 3,106,103 | 10/1963 | Smith | 74/424.7 |
| 3,489,445 | 1/1970 | Kammerer, Jr. | 403/343 |
| 3,508,773 | 4/1970 | Coberly et al. | 403/343 |
| 3,895,700 | 7/1975 | Kerr | 74/425 |
| 4,023,433 | 5/1977 | Schutz | 74/425 |
| 4,114,250 | 9/1978 | Dent | 403/343 |
| 4,459,060 | 7/1984 | Patterson | 403/343 |
| 4,503,899 | 3/1985 | Forquer | 74/425 |

Primary Examiner—Lawrence J. Staab
Assistant Examiner—M. Bednarek
Attorney, Agent, or Firm—Burns, Doane, Swecker & Mathis

[57] ABSTRACT

The present invention discloses a worm assembly comprising a first shaft; a second shaft coaxial to the first shaft, and a cylindrical worm made of hard metal and disposed between both shafts. Said first shaft is provided at the center of its end with a bolt which is closely fitted into the inner periphery of the worm and projects toward the second shaft. Said second shaft is provided at the center of it with a screw hole into which a screw portion of the bolt is screwed. Said worm is fixed unrotatably to both shafts by brazing or the others.

8 Claims, 3 Drawing Figures 4,576,058

WORM ASSEMBLY

BACKGROUND AND SUMMARY OF THE INVENTION

The present invention relates to a worm assembly having a worm and a shaft rigidly fixed thereto.

Conventionally, some of worms used in indexing devices of machine tools are made of cemented carbide or other hard metal so as to prevent teeth surfaces from wear. However, since the conventional worms are integrally formed with the shaft by the same material, the worms made of cemented carbide are very expensive, because it is necessary to use the expensive cemented carbide as the material of the shaft which is not necessary to be made of the cemented carbide.

Accordingly it is an object of the invention to provide a worm and a shaft which are independent of each other and fixed together by a bolt or other means.

Other and further objects, features and advantages of the invention will appear more fully from the following description of the preferred embodiments of the invention.

DETAILED DESCRIPTION OF THE PREFERRED EMBODIMENTS

Figure 1:
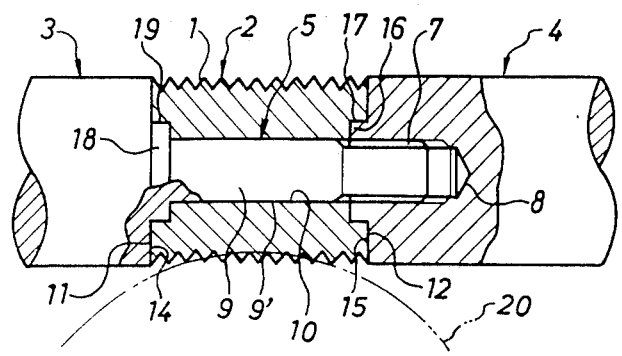
FIG. 1 is a sectional view of an embodiment of the invention.

Referring to FIG. 1, a cylindrical worm 2 having a thread-like tooth surface 1 is disposed between a pair of coaxial shafts 3 and 4. Both shafts 3 and 4 are made of well known steel or other general material and are carried by bearings 4A, 4B. The shaft 3 is provided with a coaxial bolt 5 projecting toward the shaft 4. An end surface 15 of the shaft 4 is provided at its center with a screw hole 8 for the bolt 5. A screw 7 is formed only at the end portion of the bolt 5, in other words, only in the portion which is inserted into the hole of the shaft 4. Intermediate portion 9, which is not threaded, of the bolt 5 has a completely cylindrical peripheral surface 9'. The worm 2 is made of hard metal such as cemented carbide or the like. The worm 2 is closely fitted at its inner periphery or through-bore 10 onto the outer periphery 9' of the intermediate portion 9, and is pressed at both end surfaces 11 and 12 to end surfaces 14 and 15 by the clamping force of the bolt 5. An annular boss 16 surrounding the opening of the screw hole 8 is integrally formed at the end surface 15 of the shaft 4. The boss 16 is closely fitted into an annular recess 17 provided at the end surface 12 of the worm 2. The shaft 3 is also provided at the end surface 14 with an annular boss 18 extending integrally around the bolt 5. The boss 18 is closely fitted into an annular recess 19 provided at the end surface 11 of the worm. Although they are not shown, the end surfaces 11 and 14 as well as the end surfaces 12 and 15 are fixed together by brazing. At number 20 is indicated a worm wheel meshing with the worm 2.

In the above structures, the worm 2 is fixed to both shaft 3 and 4 by means of the bolt 5 and brazing. Therefore, the bolt 5 does not loosen and no space is formed between the worm 2 and the shafts 3 and 4, which prevents the worm 2 from jolt and deviation. Further, since the worm 2 and the shafts 3 and 4 are fitted together at the recesses 17 and 19 and the bosses 16 and 18, the worm 2 and the shaft and 4 are coaxially positioned relative to each other with high accuracy. Since the worm 2 is fixed to the shafts 3 and 4 by the bolt 5 fitted into the worm 2, high strength, i.e., withstanding pressure, can be obtained with respect to the radial bending force as well as the axial expanssion and compression force applied to the worm 2. Since the end surfaces 11 and 14 as well as the end surfaces 12 and 15 are brazed to each other, respectively, sufficient strength, i.e., sufficient withstanding pressure, also can be obtained with respect to the relative rotational force between the shafts 3 and 4 and the worm 2.

According to the invention, as stated hereinbefore, the cylindrical worm 2 is fitted around the bolt 5 provided at the center of the shaft 3. The bolt 5 is screwed into the screw hole 8 in the other shaft 4 to coaxially fix the shafts 3 and 4 together. The worm 2 and the shafts 3 and 4 are fixed unrotatably together by the brazing or the others. As is apparent from the above, since the worm 2 is formed by an independent part, the worm 2 only can be made of the hard metal, which reduces manufacturing cost in comparison with the conventional structure having integral shaft portion made of the hard metal. Although the worm 2 and the shafts 3 and 4 are formed by independent parts, they can be fixed together with high strength and high accuracy.

Figure 2:
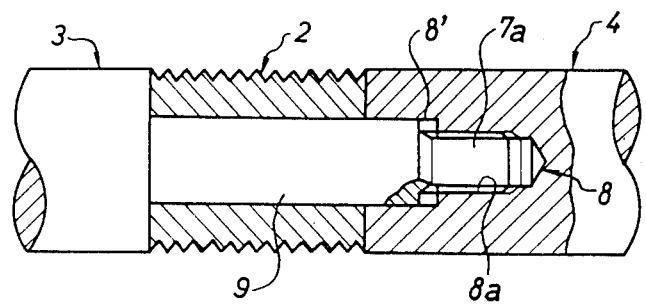
FIG. 2 is a sectional view of another embodiment of the invention.
Figure 3:
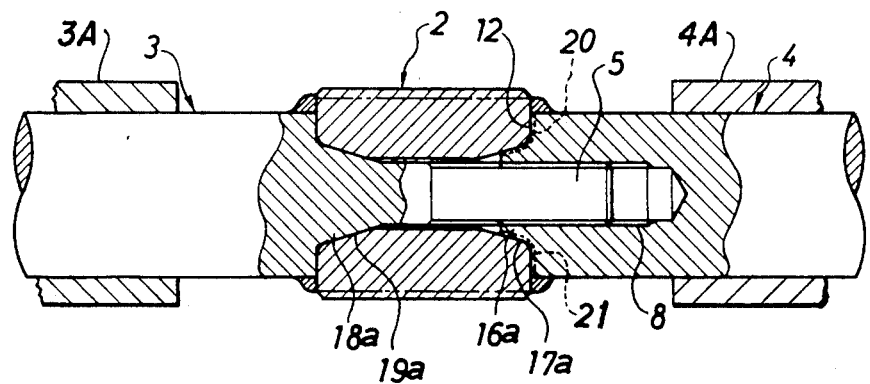
FIG. 3 is a sectional view of still another embodiment of the invention.

In modifications of the invention, the annular stepped bosses 16 and 18 as well as the recesses 17 and 19 may be eliminated as shown in FIGS. 2 and 3.

Referring to FIG. 2, the bolt is provided with a long un-threaded portion 9 of large diameter and a screw portion 7a of small diameter projecting from the end of the portion 9. The end portion of the portion 9 is closely fitted into a non-threaded portion 8' of large diameter of a hole 8, and the screw portion 7a is screwed into a threaded portion 8a of the hole 8.

Referring to FIG. 3, the shafts 3 and 4 are provided with tapered bosses 16a and 18a having tapered outer peripheral surfaces. The worm 2 is provided with tapered recesses 17a and 19a having tapered inner peripheral surfaces to which the bosses 16a and 18a are closely fitted. An end surface 12 and the peripheral surface of the boss 16a are provided with a groove 21 for an air-escape.

Instead of or in addition to the brazing, welding, caulking, a key or the like may be employed for preventing the relative rotation of the worm 2 and the shafts 3 and 4.

The worm 2 in FIGS. 1 and 2 has substantially same diameter as the shafts 3 and 4, and the worm 2 in FIG. 3 has larger diameter than the shafts 3 and 4. However, the invention may be applied to the structures in which a worm has slightly smaller diameter than the shafts.

Although the invention has been described in its preferred form with a certain degree of particularity, it must be understood that the details of construction may be changed and the combination and arrangement of parts may be varied without departing from the scope of the invention as hereinafter claimed.

What is claimed is:

1. A worm assembly comprising:
    a first shaft adapted to be supported in a bearing and including an end and a bolt projecting coaxially from said end, said bolt including an intermediate portion and terminating in a screw portion, a second shaft arranged coaxially with respect to said first shaft and adapted to be supported in a bearing, said second shaft including an end spaced from said end of said first shaft and including a screw hole extending coaxially therein and threadedly receiving said screw portion of said bolt, and a hollow cylindrical worm formed of hard metal which is harder than said first and second shafts, said worm sandwiched axially between said ends of said first and second shafts and including an inner throughbore which lies closely adjacent to said intermediate portion of said bolt which passes coaxially through said worm, said worm being fixed against rotation relative to said first and second shafts.

2. A worm assembly according to claim 1, werein said intermediate portion of said bolt is unthreaded and is fitted against said inner bore of the worm, said worm having opposite ends provided with annular recesses, each said recess including a surface extending generally in the direction of the longitudinal axis of said worm, and both shafts are provided with annular unthreaded bosses extending into and engaging said surfaces of said recesses, respectively.

3. A worm assembly according to claim 1, wherein said intermediate portion of said bolt is unthreaded and is of larger diameter than said screw portion which projects from said intermediate portion, and said screw hole is provided with a threaded portion of small diameter into which the screw portion is screwed and an unthreaded portion of larger diameter which includes a surface extending generally in the direction of the longitudinal axis of said worm, said intermediate portion of the bolt disposed within said unthreaded portion and bearing against said surface.

4. A worm assembly according to claim 1, wherein said worm has opposite ends provided with recesses having tapered surfaces, and both shafts are provided with unthreaded tapered bosses received in said recesses and engaging said surfaces.

5. A worm assembly according to claim 1, wherein said first and second shafts are made of steel.

6. A worm assembly according to claim 1, wherein said end of said second shaft abuts an end of said worm, said last-named ends defining a groove communicating the interior of said hollow worm with the exterior.

7. A worm assembly according to claim 1, including first and second bearings, said first and second shafts being rotatably supported in said first and second bearings, respectively.

8. A worm assembly according to claim 1, wherein said intermediate portion bears against a surface of said worm defining said throughbore.

* * * * *